United States Statutory Invention Registration [19]

[11] Reg. Number: H283

Myers et al. [43] Published: Jun. 2, 1987

[54] CHEMICAL TECHNIQUE FOR SEQUESTERING AMMONIA OFF-GASSING FROM SOLIDIFIED WASTE

[76] Inventors: Tommy E. Myers, 118 Villanova Dr., Vicksburg, Miss. 39180; Douglas W. Thompson, 333 Cedarwood, Jackson, Miss. 39212

[21] Appl. No.: 763,574

[22] Filed: Aug. 8, 1985

[51] Int. Cl.[4] ..... C02F 11/14

[52] U.S. Cl. ..... 210/751; 210/903; 71/36; 405/129

[58] Field of Search ..... 71/12, 13, 25, 36; 210/609, 631, 710, 717, 724, 723, 726, 751, 903; 405/129; 423/302, 313

[56] References Cited

U.S. PATENT DOCUMENTS

| | | | |
|---|---|---|---|
| Re. 29,783 | 9/1978 | Smith et al. | 210/751 |
| 2,723,954 | 11/1955 | Young | 210/770 |
| 3,320,048 | 5/1967 | Legal et al. | 423/313 |
| 3,948,769 | 4/1976 | Dobbs | 210/673 |
| 3,980,558 | 9/1976 | Thompson | 210/751 |
| 4,028,130 | 6/1977 | Webster et al. | 210/751 |
| 4,028,240 | 6/1977 | Manchak | 210/751 |
| 4,149,968 | 4/1979 | Kupiec | 210/751 |
| 4,219,441 | 8/1980 | Noshimura et al. | 210/673 |
| 4,460,555 | 7/1984 | Thompson | 423/309 |

FOREIGN PATENT DOCUMENTS

| | | | |
|---|---|---|---|
| 54-121560 | 9/1979 | Japan | 210/903 |
| 54-127148 | 10/1979 | Japan | 210/903 |

OTHER PUBLICATIONS

*The Condensed Chemical Dictionary,* 8th Edition, Van Nostrand Reinhold Company, 1971.

*Primary Examiner*—John F. Terapane
*Assistant Examiner*—Susan Wolffe

[57] ABSTRACT

A method for sequestering ammonia off-gassing by chemical treatment of certain hazardous wastes prior to solidification of such wastes, the invention involves mixing of magnesium sulfate heptahydrate and phosphoric acid with waste containing ammonia nitrogen to form ammonium magnesium phosphate hexahydrate complex and thus control the release of ammonia vapors during the solidification process and from the cured and solidified waste products of the solidification process. The present method results in the precipitation and complexation of ammonia nitrogen in the waste to effectively isolate the ammonia nitrogen in a substantially water insoluble complex which is incorporated into a solid product disposable within landfill sites after further treatment with solidification reagents in known solidification processes. The several embodiments of the present method are preferably employed to pretreat ammonia nitrogen containing waste prior to use of a solidification process, thereby significantly reducing the amount of ammonia gas released during solidification processing.

20 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CHEMICAL TECHNIQUE FOR SEQUESTERING AMMONIA OFF-GASSING FROM SOLIDIFIED WASTE

STATEMENT OF GOVERNMENT INTEREST

The invention described and claimed herein may be manufactured and used by or for the Government of the United States of America for governmental purposes without the payment of royalties thereon or therefor.

BACKGROUND OF THE INVENTION

1. Field of the Invention

The invention relates generally to hazardous waste disposal employing known solidification processes and particularly relates to methods for controlling the release of ammonia from waste containing ammonia nitrogen during solidification processing and also from solid waste so processed.

2. Description of the Prior Art

Storage of certain chemical wastes resulting from the manufacture of industrial and agricultural chemicals as well as the destruction of materials such as obsolete chemical munitions has long presented a serious waste management problem. Chemical wastes of this nature including pesticide residues have long been simply held in evaporation basins which now contain a complex mixture of materials having significant concentrations of chloride, organic carbon, ammonia-nitrogen, and various toxic substances such as aldrin, arsenic and cyanide with the principal dissolved salts being ammonium and sodium sulfates and chlorides. Significant quantities of copper are also present in these existing waste-containing basins. Liquid in such basins contacts precipitated solids in the basins and, as evaporation continues, approaches an equilibrium condition beyond which continued volume reduction by evaporation becomes negligible. Due to the complexity of the chemical mixtures found in these evaporation basins, detoxification treatments are largely ineffective and/or uneconomical. Accordingly, solidification processing for landfill storage is the method of choice for eliminating the undesirable storage of these toxic wastes in open basins. While a number of solidification technologies exist, the typical solidification process involves mixing of a setting agent or agents with the waste to form a hard, durable product which is substantially insoluble in water and in which the waste contaminants are entrapped in a solidified mass. A number of commercially available solidification processing techniques are in use at the present time with the most common setting agents being Portland cement, flyash, kiln dust, lime, soluble silicates, gypsum and various combinations of these materials.

Patented examples of solidification processes include U.S. Pat, No. Re. 29,783 to Smith et al. which teaches the addition of lime, sulfate ions and flyash as a source of aluminum ions to waste to form a solid product intended for landfill storage. Kupiec et al., in U.S. Pat. No. 4,149,968, mixes bentonite clays and Portland cements with aqueous waste in order to form an insoluble, solidified waste material. In U.S. Pat. No. 3,837,872, Connor proposes the solidification of aqueous waste with alkali metal silicates. Manchak, Jr. in U.S. Pat. Nos. 4,028,240 and 4,079,003 proposes the mixing of lime with oil sump waste and the like for solidification and ultimate storage in landfill sites. A number of additional techniques exist including techniques described in the foreign patent literature, such as United Kingdom 1,485,625 and examples also exist in the non-patent literature itself. Solidification technologies are generally classified by the United States Patent Office in Class 210, subclass 751, as well as other classifications within the patent classification system.

Solidification processing of the toxic waste referred to above usually results in the undesirable evolution of ammonia vapors due to the fact that the usual setting agents involved in solidification processing are alkaline materials. As a result, the products of solidification processing are basic on the pH scale with the final pH of the solidified product depending on the type and amount of setting agent used. This evolution of ammonia gas during solidification processing represents a substantial air quality problem as well as a health safety hazard for workers involved in processing of the toxic wastes. While ammonia evolution during processing is in and of itself a substantial problem, it is also the case that a continued release of ammonia gas in the solidified waste itself also presents problems once the solidified waste is relocated to a landfill site. The evolution of ammonia gas from a landfill site presents an unacceptable air quality hazard and cannot be tolerated.

The present invention provides a method for pretreatment of toxic waste of the nature described above prior to solidification processing such as by means of the technology referred to hereinabove. In particular, the present method intends the sequestering of ammonia off-gassing by chemical conversion of the ammonia into a solid precipitant which is essentially insoluble in water. The prior art does not describe such a teaching. As an example of prior art teachings, Thompson, in U.S. Pat. No. 4,460,555 describes a water-insoluble magnesium phosphate product which can be used to treat sewage waste water to form $MgNH_4PO_4$. The magnesium phosphate product described by Thompson is formed from a buffered magnesium hydroxide solution in phosphoric acid. However, Thompson does not describe a process capable of sequestering ammonia off-gassing from toxic waste materials, during solidification processing nor does Thompson describe the particular process taught herein. Noshimura et al., in U.S. Pat. No. 4,219,441, and Dobbs, in U.S. Pat. No. 3,948,769, describe methodology for removal of ammonium nitrogen from waste water. Nashimura et al. utilize a zeolite and are primarily concerned with regeneration of the zeolite. Dobbs describes the use of a hydrous zirconium oxide ligand exchanger which has been conditioned with a salt of a metal such as $CuSO_4$ capable of forming a complex with ammonia.

The prior art does not provide a solution to the problem of ammonia off-gassing occurring during solidification processing of hazardous waste as well as during the storage of solidified products so produced which contain ammonia.

SUMMARY OF THE INVENTION

The invention intends solution to the problem of ammonia off-gassing during solidification processing of hazardous waste and also of the release of ammonia vapors from cured solidified waste. The invention provides methodology for sequestering ammonia off-gassing by the chemical conversion of ammonia into a solid precipited by the addition to the waste of materials capable of precipitating and complexing ammonia nitrogen. Practice of the present method preferably occurs prior to initiation of solidification processing; however, the present methodology could be practiced with solidification processes after initiation of the solidification process but prior to steps within such solidification processes which would liberate ammonia vapors or result in ammonia off-gassing.

The present methodology particularly involves the treatment and disposal of ammonia nitrogen bearing aqueous waste and is useful in the treatment of both liquid waste and semi-solid sludges. The present processes result in the complexation and precipitation of ammonia nitrogen such that the release of ammonia in subsequent solidification treatment processes which use alkali or caustic reagents is eliminated or significantly reduced. As used herein, the term "waste" includes any form of sanitary or industrial wastewater, sludge or any other material generated by sanitary disposal facilities or by an industrial process. Waste as referred to herein thus includes sanitary sewage, sludges from sewage treatment plants, spent pickling liquors, plating rinse water, sludges resulting from the neutralization, oxidation and/or precipitation of heavy metals, sludges from the physical or chemical treatment of industrial wastewater, refinery wastes, flue-gas cleaning sludges, water treatment plant sludges, tannery wastes, organic manufacturing wastes, paint and pigment wastes, polymer production wastes, waste due to destruction of chemical munitions and the like, and any other waste, liquid or solid, resulting from any manufacturing process.

In a preferred form of the invention, two materials are mixed with the waste prior to any subsequent treatment according to known techniques such as by solidification processing. A first material utilized according to the invention provides the capability of producing a sufficient concentration of magnesium ions or equivalents thereof with the second material being capable of producing a sufficient concentration of phosphate ions or equivalents thereof, the two materials acting to precipitate or complex ammonia nitrogen present in the waste. The preferred source of magnesium according to the invention is magnesium sulfate heptahydrate with the preferred source of phosphate being concentrated phosphoric acid. Alternative embodiments of the invention can be practiced through the utilization of other magnesium sources such as anhydrous magnesium sulfate, magnesium chloride, magnesium oxide and magnesium nitrate as examples. These alternative materials are suitable for use but are typically not available in sufficient quantities or at sufficiently reasonable costs to allow their use in large-scale waste disposal operations. Alternate sources of phosphate include sodium phosphate, sodium hydrogen phosphate, sodium dihydrogen phosphate, potassium phosphate, potassium hydrogen phosphate, potassium dihydrogen phosphate, rock phosphate and other materials which are suitable for use but which are either not readily available or uneconomical. A material such as magnesium phosphate provides a desirable source of reactive magnesium and phosphate ions and can be used when available and when cost effective.

Treatment of waste as taught herein results in the precipitation of ammonia nitrogen through the addition of magnesium and phosphate ions to the waste, the ammonia nitrogen being precipitated as ammonium magnesium phosphate having a solubility product of $2.5\times10^{-13}$ at 25° C. Sequestering of ammonia nitrogen according to the invention thereby results in the formation of ammonia magnesium phosphate hexahydrate complex with a sufficiently low solubility product to prevent ammonia off-gassing both during and subsequent to solidification processing with alkaline setting agents.

Accordingly, it is an object of the present invention to provide a method for sequestering ammonia off-gassing from hazardous waste so as to prevent the release of ammonia vapors and gases from waste during solidification processing and from the cured solid products of solidification processing.

It is another object of the present invention to provide a method for precipitating and/or complexing ammonia nitrogen in waste materials to form a solid precipitant having a solubility product which is sufficiently low to result in the sequestering of ammonia off-gassing.

It is a further object of the present invention to provide a method for treatment of hazardous waste containing ammonia nitrogen by the addition of magnesium and phosphate ions to the waste to eliminate or reduce the release of ammonia vapors and/or gases from the waste, thereby to facilitate solidification of such wastes by known solidification processing and to eliminate or reduce release of ammonia from the solidified cured products of solidification processing.

Further objects and advantages of the invention will become more readily apparent in light of the following detailed description of the preferred embodiments.

DESCRIPTION OF THE PREFERRED EMBODIMENTS

In the sequestering of ammonia off-gassing from hazardous waste according to the present invention, magnesium sulfate heptahydrate $MgSO_4$, $7H_2O$ and concentrated phosphoric acid $H_3PO_4$ are admixed with the hazardous waste which contains ammonia nitrogen according to a preferred embodiment of the invention. The magnesium and phosphate ions added to the waste are intended to precipitate and/or complex ammonia nitrogen present in the waste in order to remove the ammonia nitrogen from potential off-gassing when alkaline materials are used in the further treatment of the waste, such as in solidification processing. The setting agents which are used in usual solidification processes are alkaline materials, the pH of the waste during processing and the pH of the solidified cured product of the processing being basic on the pH scale with the final pH being dependent upon the type and amount of setting agent which is utilized. A basic equilibrium exists between the dissolved gas or aqueous ammonia $NH_{3aq}$ and the ammonium ion $NH_4^+$ according to the following equation:

$$NH_{3aq} + HOH \rightleftharpoons NH_4^+ + OH^-$$

Figure 1:
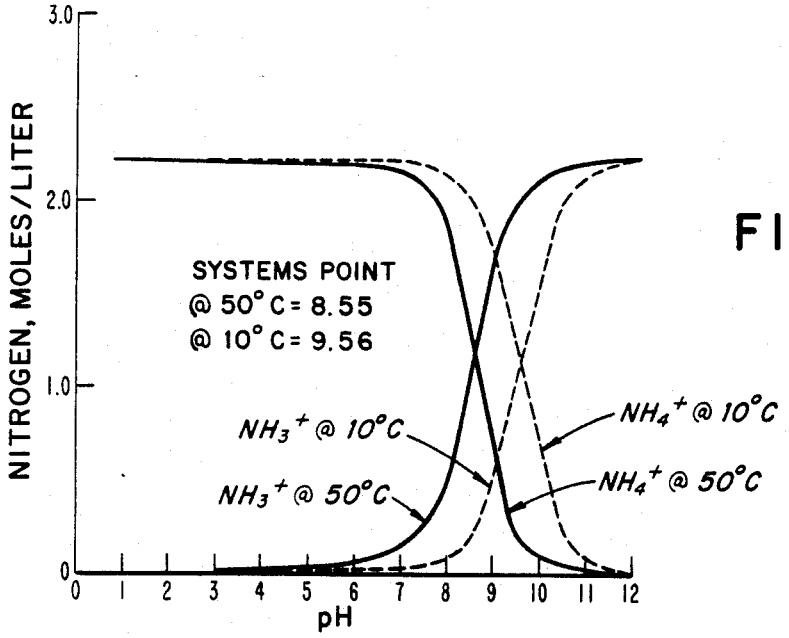
FIG. 1 shows the pH and temperature dependency of the partitioning between aqueous ammonia and ammonium ion for a 2.2 molar solution in the basic equilibrium existing between aqueous ammonia and the ammonium ion as described below.

Elevation of either the pH or temperature shifts the equilibrium of the above equation toward aqueous ammonia. The pH and temperature dependency of the partitioning between aqueous ammonia and ammonium ion for a 2.2 molar solution is shown in FIG. 1. As can be seen from the relationship illustrated in FIG. 1, a pH greater than 10 causes practically all of the total ammonia nitrogen to exist as aqueous ammonia. A final pH of greater than 10 is typical of many solidification processes and particularly those processes which utilize lime as the setting agent. In addition to exhibiting a basic pH, most and perhaps all setting reactions involve exothermic hydration which increases the temperature of freshly prepared solidified waste. Further, as the setting agents begin to act, the liquid phase in which ammonia gas is dissolved diminishes rapidly by several orders of magnitude. The combined effects of basic pH conditions, exothermic reactions, and reduced liquid phase results in the release of ammonia gas during the typical waste solidification process. The value of complexing and/or precipitating ammonia nitrogen within such wastes such as are defined above is thus seen to have substantial value in that ammonia vapors and/or gas release can be controlled or eliminated according to the teachings of the present invention.

In a preferred practice of the invention, the sequestering reagents used to complex and/or precipitate ammonia nitrogen from the waste are added prior to the addition of an alkaline solidification reagent. It is contemplated that the sequestering reagents can be added in at least some instances during the solidification process but it is preferred and essentially necessary to add the sequestering reagents prior to the addition to the waste of any alkaline solidification reagent. On the basis of stoichiometry, one mole of ammonia requires one mole of magnesium and one mole of phosphate for removal by precipitation as ammonium magnesium phosphate $NH_4MgPO_4 \cdot 6H_2O$. As indicated hereinabove, a preferred source of magnesium is magnesium sulfate heptahydrate and a preferred source of phosphate is concentrated phosphoric acid. Other sources of magnesium and phosphate are available as described hereinabove and can be utilized where these materials are available and economically obtainable.

The treatment process according to the invention is accomplished by the formation of an ammonium magnesium phosphate complex having six waters of hydration. The resulting complex ion effectively reduces the chemical activity of ammonia nitrogen and is substantially insoluble in water such that on formation, the ammonia nitrogen is precipitated. The solubility product of ammonium magnesium phosphate is on the order of $10^{-13}$ and is therefore sufficiently low to provide an effective removal process for ammonia via the precipitation mechanism according to the invention. By virtue of ammonia nitrogen precipitation and by virtue of reduced chemical activity by complexation, the amount of ammonia nitrogen available for conversion to ammonia gas due to increased pH and temperature is significantly reduced. Volatilization of ammonia is a two-step process involving conversion of ammonium ion to aqueous ammonia followed by the interphase transfer of aqueous ammonia from the liquid to the atmosphere above the liquid. The present process effectively reduces ammonia vaporization and off-gassing when alkaline reagents are added to ammonia nitrogen bearing waste by removing ammonium ion and thereby preventing its conversion to aqueous ammonia and subsequently its discharge as a gas to the atmosphere.

The large variety of liquid and semi-solid waste generated during industrial manfacturing and waste disposal operations have a variety of differing chemical and physical properties. Accordingly, the amount and type of sequestering reagents best suited for a job will vary depending on the particular waste which is to be treated. In treating any specific waste the determination of the particular sequestering reagents and the quantities of the reagents which are to be used can be accomplished in a number of differing ways. In some cases, a determination of the available magnesium and phosphate ionic concentrations and comparison of the ratios of these concentrations to the preferred ionic ratio taught herein is typically the most convenient way of determining those sequestering reagents and the quantities of the reagents which are necessary. When it is known, for example, that a given waste has a certain concentration of ammonia nitrogen, the amounts of magnesium and phosphate ion sources which are to be used can be calculated from chemical stoichiometry by applying the techniques taught herein. In certain situations, the complex nature of the waste materials require the use of trial and error techniques as a practical approach for those complicated wastes for which ionic concentration is not a good indicator of chemical activity. The amounts of magnesium ion source and phosphate ion source, or equivalents thereof, required to accomplish a desired reduction in ammonia off-gassing can be determined according to the teachings herein provided for the purpose of determining the chemical availability of source materials for complex ion formation.

As noted above, the precipitation of ammonia nitrogen as ammonium magnesium phosphate hexahydrate requires one mole of magnesium ion and one mole of phosphate ion for each mole of ammonia nitrogen to be precipitated. The stoichiometric ratio SR is defined as the ratio of the number of moles of sequestering reagents used to the number of moles of ammonia nitrogen in a quantity of waste. In order to optimize the effectiveness of the present invention for sequestering ammonia off-gassing from a specific waste of interest, it is necessary to experimentally determine the appropriate SR to accomplish a desired reduction in ammonia off-gassing. A preferred procedure for accomplishing this determination is now described.

A known quantity of waste, for example 50 grams, is placed in a glove box or similar environmental chamber with the required quantities of magnesium sulfate heptahydrate and phosphoric acid for a given SR along with the required quantities of solidification reagents needed to solidify the waste. The waste is mixed with the sequestering reagents prior to the addition of the alkaline solidification reagent or reagents. After addition of the alkaline solidification reagent, the ammonia concentration in the atmosphere of the glove box is measured at regular intervals using standard quantitative analytical procedures until the concentration of ammonia becomes constant. The amount of ammonia gas released per gram of waste treated is calculated according to the following formula:

$$X = (\text{VOL BOX})\,(N) / (\text{WT of WASTE})$$

where

X = mass ammonia released, milligrams ammonia/-kilograms of waste

VOL BOX = volume of glove box, cubic meters

N = the asymptotic concentration of ammonia in the glove box atmosphere, milligrams per cubic meter WT of WASTE = mass of waste treated, kilograms The procedure thus noted is then repeated for at least three different values of SR. From the data so obtained, a curve is prepared of the mass of ammonia released per gram of waste treated X versus stoichiometric ratio SR. The curve thus generated is used to determine the SR required to effect the needed reduction in ammonia off-gassing as is illustrated by the following example.

EXAMPLE

Solidification processing of liquid waste from a hazardous waste lagoon resulted in the release of significant quantities of ammonia gas upon the addition of various process additives. The use of lime as a solidification reagent resulted in the liberation of very significant quantities of ammonia gas. Chemical analysis of the waste showed that the waste contained 31,000 mg/liter of ammonia nitrogen (2.2 molar). Solidification using a soil/flyash/lime process was found to have highly unsatisfactory ammonia off-gassing characteristics. Using the procedure noted above to determine SR and the liquid waste described immediately above, the experimental data provided in Tables 1 through 5 were obtained. Table 1 presents glove box data for ammonia off-gassing when no sequestering reagents were used, that is, when SR is taken equal to 0. Table 2 presents glove box data for ammonia off-gassing when SR = 1.0, while Tables 3, 4 and 5 represent glove box data for SR values of 1.15, 1.5 and 2.0, respectively. In each table, the amount of waste treated, the amounts of soil, flyash and lime used to solidify the waste as well as the amounts of magnesium sulfate heptahydrate and phosphoric acid used to sequester ammonia off-gassing are also presented.

TABLE 1

| Glove Box Experiment No. 1 | |
|---|---|
| SR: | 0 |
| Materials: | |
| Waste | 100 g |
| Soil | 80 g |
| Flyash | 80 g |
| Lime | 80 g |
| $MgSO_4.7H_2O$ | 8 |
| $H_3PO_4$ | 0 |
| Time (min) | $NH_3$ ($mg/M^3$) |
| 10 | 4200 |
| 20 | 5500 |
| 30 | 6300 |
| 45 | 7000 |
| 60 | 7000 |
| 80 | 7000 |
| 100 | 7000 |
| 120 | 7000 |
| 180 | 7000 |
| 240 | 7000 |

TABLE 2

| Glove Box Experiment No. 2 | |
|---|---|
| SR: | 1.0 |
| Materials: | |
| Waste | 100 g |
| Soil | 80 g |
| Flyash | 80 g |

TABLE 2-continued

| Glove Box Experiment No. 2 | |
|---|---|
| Lime | 80 g |
| $MgSO_4.7H_2O$ | 46.2 g |
| $H_3PO_4$ | 16.7 g |
| Time (min) | $NH_3$ ($mg/M^3$) |
| 15 | 2800 |
| 30 | 4200 |
| 60 | 4900 |
| 80 | 4900 |
| 100 | 4900 |
| 120 | 4900 |
| 180 | 4900 |
| 240 | 4900 |

TABLE 3

| Glove Box Experiment No. 3 | |
|---|---|
| SR: | 1.15 |
| Materials: | |
| Waste | 100 g |
| Soil | 80 g |
| Flyash | 80 g |
| Lime | 80 g |
| $MgSO_4.7H_2O$ | 53.1 g |
| $H_3PO_4$ | 19.2 g |
| Time (min) | $NH_3$ ($mg/M^3$) |
| 10 | 142 |
| 20 | 390 |
| 30 | 781 |
| 45 | 1050 |
| 60 | 1250 |
| 80 | 1610 |
| 180 | 1960 |

TABLE 4

| Glove Box Experiment No. 4 | |
|---|---|
| SR: | 1.5 |
| Materials: | |
| Waste | 100 g |
| Soil | 80 g |
| Flyash | 80 g |
| Lime | 80 g |
| $MgSO_4.7H_2O$ | 69.3 g |
| $H_3PO_4$ | 25.1 g |
| Time (min) | $NH_3$ ($mg/M^3$) |
| 15 | 7 |
| 30 | 9 |
| 45 | 11 |
| 60 | 14 |
| 80 | 21 |
| 100 | 30 |
| 120 | 39 |
| 180 | 71 |
| 240 | 83 |
| 300 | 160 |
| 360 | 194 |
| 510 | 236 |

TABLE 5

| Glove Box Experiment No. 5 | |
|---|---|
| SR: | 2.0 |
| Materials: | |
| Waste | 100 g |
| Soil | 80 g |
| Flyash | 80 g |
| Lime | 80 g |
| $MgSO_4.7H_2O$ | 92.4 g |
| $H_3PO_4$ | 33.4 g |

TABLE 5-continued

| Glove Box Experiment No. 5 | |
|---|---|
| Time (min) | $NH_3$ ($mg/M^3$) |
| 10 | 21 |
| 15 | 28 |
| 25 | 28 |
| 35 | 28 |
| 45 | 28 |
| 60 | 28 |
| 80 | 28 |
| 100 | 28 |
| 120 | 28 |
| 180 | 36 |
| 240 | 36 |

TABLE 6

| | N and X values | | |
|---|---|---|---|
| Experiment No. | SR | N ($mg/m^3$) | X (mg/kg) |
| 1 | 0 | 7000 | 2.70 |
| 2 | 1.0 | 4900 | 1.52 |
| 3 | 1.15 | 2232.8 | 0.677 |
| 4 | 1.5 | 200 | 0.05755 |
| 5 | 2.0 | 30.3 | 0.00813 |

Figure 2:
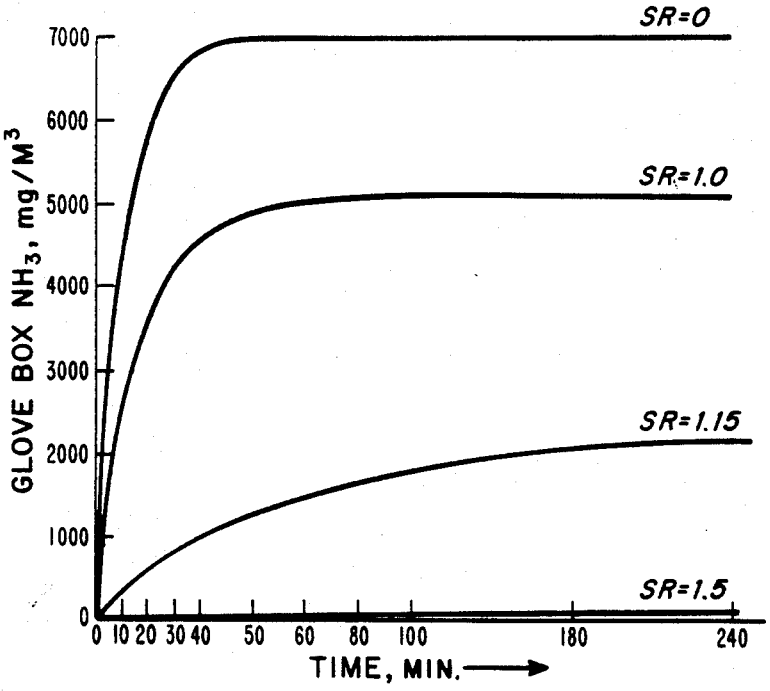
FIG. 2 is a plot of ammonia concentrations an release time data for a sample solidification processing of liquid waste from a hazardous waste lagoon as described in the EXAMPLE below.

Ammonia concentrations and release time data from Tables 1 through 5 are plotted in FIG. 2. The curves in FIG. 2 show the effectiveness of the invention in reducing ammonia off-gassing from solidified waste. It is to be noted that the curve for the data from Table 5 is essentially coincidental with the horizontal axis shown in FIG. 2. It is further noted that each curve asymptotically approaches the maximum value, this maximum value being the asymptotic ammonia concentration N referred to in the equation referred to above. The value of N can be determined through the use of the maximum value from the raw data. For example, in Table 1 is it obvious that N =7000 mg per cubic meter. However, since this value is not always accurate, data such as that put forth in Table 3 shows that N can be determined graphically from extrapolation of the curve drawn through the plotted data. A mathematical-statistical model for the glove box experiments can also be used as follows:

$$y=N\,(1-e^{-kt})$$

where y =ammonia concentration in the glove box ($mg/m^3$)
N =asymptotic ammonia concentration ($mg/m^3$)
k =release rate constant ($min^{-1}$)
t =release time (minutes)

A statistical curve fitting technique can be used to determine both N and k, this procedure being used to determine N for the data in Tables 4 and 5. The asymptotic ammonia concentration N determined for the data in Tables 1 through 5 as noted above and the mass of ammonia released X calculate according to the equation relevant thereto as noted above presented in Table 6 above.

Figure 3:
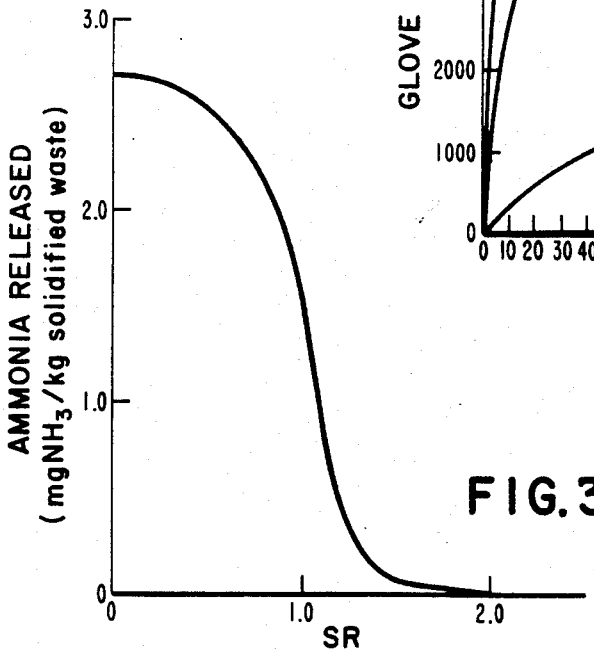
FIG. 3 is a plot of ammonia released versus stoichiometric ratio SR using values calculated for the sample solidification processing of liquid waste from a hazardous waste lagoon as described in the EXAMPLE below.

Referring now to FIG. 3, a plot of X versus SR is given and can be used to determine the SR required to effect a given reduction in ammonia off-gassing. For example, if it is required that X be less than or equal to 0.06 mg $NH_3$/kg waste, then the SR that should be used is SR =1.5. From the SR determined to be necessary, the required amounts of sequestering reagents can be determined. For example, for SR =1.0, 69.3 grams of magnesium sulfate heptahydrate and 25.1 grams of phosphoric acid are required for each 100 grams of waste which is solidified.

While the foregoing example serves to illustrate the practice of the invention, it is to be understood that the proportions of sequestering reagents applicable to all waste cannot be stated with specificity as is readily understood from the diverse nature of the waste which can be treated according to the invention. In all situations, the proportions can be readily determined according to the example given above.

The present sequestering technique contemplates at least two mechanisms which effect the release of ammonia gas. The first mechanism involves the precipitation of ammonium magnesium phosphate hexahydrate $NH_4MgPO_4.6H_2O$. The second mechanism involves the lowering of the pH of the treated mass by phosphoric acid when used as the phosphate source. The amount of phosphoric acid used in the most extreme sequestering ratio noted above, that is, when SR =2.0, leaves in excess of 0.1 moles of hydroxide ion when neutralized by lime added as a solidification reagent. Theoretically, the excess would yield a pH of 14 although this excess of hydroxide ion would not necessarily raise the pH of the solidified product to this degree especially when the temperature rise associated with the setting reaction is taken into consideration. Given the results attendant to the present process, the precipitation of ammonium magnesium phosphate hexahydrate is therefore considered to be the dominant sequestering mechanism.

Ammonium magnesium phosphate hexahydrate has a solubility product of $2.5\times10^{-13}$ and the equilibrium partitioning of ammonium ion between dissolved and precipitated species is described by:

$$K_{sp}=[NH_4^+][Mg^{++}][PO_4^{---}]$$

According to this equation for solubility product, the addition of excess magnesium and phosphate to the solution will result in the removal of ammonium ion from solution as ammonium magnesium phosphate hexahydrate until the solubility product equation is satisfied. For pure water, the solubility product equation indicates that a precipitate will form at any time during which the product of the right hand side of the equation exceeds $2.5\times10^{-13}$. In such a system, it can be shown that as long as magnesium and phosphate are in excess, the maximum ammonium ion concentration which can remain in solution is approximately $10^{-4}$ molar. In a complex chemical mixture such as is treated according to the present invention, competing reactions for the excess magnesium and phosphate exist. Since equilibrium conditions usually require a period of time which is greater than is practical to practice, it is necessary to add additional magnesium and phosphate than that indicated by simple stoichiometric geometry in order to effectively precipitate the ammonium ion. Since larger SR values representing increased dosages of sequestering reagents can produce correspondingly smaller reductions in ammonia off-gassing, it is considered practical that the dosing of reagents at a level corresponding to a stoichiometric ratio SR of 1.5 is typically the maximum degree of sequestering that is practical or cost effective.

It is also believed that the addition of the ammonia sequestering reagents, particularly magnesium sulfate heptahydrate and concentrated phosphoric acid, contribute to the development of a stronger solidification product through two mechanisms. Firstly, the ammonium magnesium phosphate hexahydrate precipitates appear to participate in the setting reactions occurring during solidification. Secondly, the additional sulfate ions provided by the magnesium sulfate reagent can assist the formation of hydrated calcium sulfoaluminates and hydrated calcium aluminosulfates which are the principal strength yielding products of lime - flyash reactions.

Although the practice of the present invention has been explicitly described relative to the addition of magnesium sulfate and phosphoric acid to ammonia containing waste, it should be understood that the invention can be practiced other than as explicitly described hereinabove without departing from the intent of the invention. In particular, the various reagents referred to herein can be utilized depending upon availability and cost effectiveness. Further, the practice of the invention in concert with solidification processes can vary in the temporal accomplishment of method steps with a primary consideration being the addition of the sequestering reagents prior to addition of alkaline solidification reagents and/or the release of substantial ammonia from the waste such as obtains from the addition of alkaline solidification reagents. Accordingly, the invention can be practiced other than as explicitly described herein and the scope of the invention is to be defined according to the recitation of the attendant claims.

What is claimed is:

1. A method for treatment of waste containing ammonia nitrogen to sequester ammonia off-gassing from the waste, comprising the step of admixing with the waste a source of magnesium ions and a source of phosphate ions in a quantity sufficient to at least partially complex and precipitate the ammonia nitrogen present in the waste.

2. The method of claim 1 wherein the source of magnesium ions is selected from the group consisting of magnesium sulfate heptahydrate, anhydrous magnesium sulfate, magnesium chloride, magnesium oxide, magnesium nitrate and magnesium phosphate.

3. The method of claim 1 wherein the source of phosphate ions is selected from the group consisting of phosphoric acid, sodium phosphate, sodium hydrogen phosphate, sodium dihydrogen phosphate, potassium phosphate, potassium hydrogen phosphate, potassium dihydrogen phosphate, rock phosphate and magnesium phosphate.

4. The method of claim 1 wherein the source of magnesium ions consists of magnesium sulfate heptahydrate and the source of phosphate ions consists of concentrated phosphoric acid.

5. The method of claim 1 wherein the magnesium ions and the phosphate ions are present in the waste in a stoichiometric ratio of between 1.0 and 2.0.

6. The method of claim 1 wherein the magnesium ions and the phosphate ions are present in the waste in a stoichiometric ratio of 1.5.

7. The method of claim 6 wherein the source of magnesium ions consists of magnesium sulfate heptahydrate and the source of phosphate ions consists of concentrated phosphoric acid.

8. The method of claim 1 wherein the admixture of the magnesium ions and phosphate ions with the waste occurs in association with the solidification of the waste according to known waste solidification processing.

9. The method of claim 8 wherein the known waste solidification processing involves addition to the waste of one or more alkaline setting agents.

10. The method of claim 9 wherein the step of admixing of the magnesium ions and phosphate ions occurs prior to admixture with the waste of an alkaline setting agent.

11. The mixture of claim 1 wherein the magnesium ions and phosphate ions combine with ammonia nitrogen contained in the waste to form a complex which is substantially insoluble in water.

12. The method of claim 1 wherein the source of magnesium ions consists of magnesium sulfate heptahydrate and the source of phosphate ions consists of concentrated phosphoric acid, the ammonia nitrogen contained in the waste being precipitated in the form of an ammonium magnesium phosphate hexahydrate complex which is substantially insoluble in water.

13. A method for disposal of waste containing ammonia nitrogen, comprising the steps of:

admixing with the waste a source of magnesium ions and a source of phosphate ions in a quantity sufficient to complex and precipitate the ammonia nitrogen present in the waste;

solidifying the resulting waste by the addition of at least one solidification reagent; and, placing the solidified waste in a landfill site.

14. The method of claim 13 wherein the solidified reagent comprises an alkaline solidification reagent.

15. The method of claim 14 wherein the source of magnesium ions is selected from the group consisting of magnesium sulfate heptahydrate, anhydrous magnesium sulfate, magnesium chloride, magnesium oxide, magnesium nitrate and magnesium phosphate.

16. The method of claim 14 wherein the source of phosphate ions is selected from the group consisting of phosphoric acid, sodium phosphate, sodium hydrogen phosphate, sodium dihydrogen phosphate, potassium phosphate, potassium hydrogen phosphate, potassium dihydrogen phosphate, rock phosphate and magnesium phosphate.

17. The method of claim 14 wherein the source of magnesium ions consists of magnesium sulfate heptahydrate and the source of phosphate ions consists of concentrated phosphoric acid.

18. The method of claim 14 wherein the magnesium ions and the phosphate ions are present in the waste in a stoichiometric ratio of between 1.0 and 2.0.

19. The method of claim 18 wherein the magnesium ions and the phosphate ions are present in the waste in a stoichiometric ratio of 1.5.

20. The method of claim 14 wherein the solidification reagent comprises lime.

* * * * *